Patented Aug. 7, 1945

2,381,561

UNITED STATES PATENT OFFICE

2,381,561

POLYMERIZATION OF VINYL COMPOUNDS

Hanns Peter Staudinger, Ewell, Karl Heinrich Walter Tuerck, Banstead, and Cyril Alfred Brighton, Ewell, England, assignors to The Distillers Company Limited, Edinburgh, Scotland, a company of Great Britain No Drawing. Application December 17, 1941, Serial No. 423,362. In Great Britain November 11, 1940

7 Claims. (Cl. 260—88)

The present invention is for improvements in or relating to the polymerization of vinyl compounds as well as compounds of the formula $CH_2=CXY$ wherein X and Y are radicals other than hydrogen and alkyl such as for example vinyl halides, esters, ethers, ketones, vinyl aromatic hydrocarbons; also acrylic acid and methacrylic acid, or the esters, amides or nitriles of these acids and the halogen substitution products thereof. Mixtures of one or more of these compounds may also be used.

In prior processes the polymerization of such substances has been carried out with the aid of catalysts such as benzoyl peroxide or acetyl benzoyl peroxide. Both of these catalysts, however, are unsatisfactory in that the polymers produced by their use contain small quantities of benzoic acid (produced by the decomposition of the peroxide) which has to be removed if a satisfactory polymer is to be obtained, and it will be appreciated that in many uses of such polymers, e. g. in electrical insulation, the presence of polar bodies would have a very deleterious effect upon the dielectric properties of the polymer.

According to the present invention a process for the polymerization of a vinyl halide comprises polymerizing said vinyl halide in the liquid phase and in the presence of a catalyst consisting of a peroxidic compound derived from a carbonyl compound, containing not less than three and not more than four carbon atoms in the molecule and containing an olefinic double bond.

We have found that such catalysts are excellent polymerization catalysts and the polymers obtained by their use are not contaminated as are the polymers obtained by the use of benzoyl or acetyl benzoyl peroxide.

Suitable carbonyl compounds are acrylic acid, methacrylic acid, crotonic acid, or their corresponding aldehydes.

Polymerization catalysts for use in the present invention may easily be obtained for example by the catalytic oxidation of aldehydes containing 3 or 4 carbon atoms in the molecule and an olefinic double bond with molecular oxygen at low temperatures. Alternatively they may be obtained as by-products in the process described in our co-pending application Serial No. 411,758 filed Sept. 20, 1941, now U. S. Patent No. 2,341,339.

We have found that the peroxides or per-acids derived from acrolein, methyl acrolein and crotonaldehyde are particularly suitable for use as polymerization catalysts. The per-compounds may be isolated before use, but it is not necessary to effect such isolation. In fact, it is preferable to use the reaction mixture obtained by the oxidation of unsaturated aldehydes preferably after any unchanged aldehyde has been removed.

The following may be given as a method of preparation of the catalyst solution:

A 50% (weight) solution of acrolein in acetone is oxidized with molecular oxygen at 25–30° C. in the presence of vanadium pentoxide as catalyst. After three hours the solution contains 7.5% by weight of per-compounds as estimated by titration with potassium iodide. After removing unchanged acrolein by distillation under reduced pressure the solution may be used in the polymerization.

An example of one method of carrying out the polymerization is:

5 ccs. of the above solution were added to a mixture of 20 grs. of vinyl chloride and 20 grs. of acetone. The mixture was heated to 40° C. for 72 hours, after which time 60% of the vinyl chloride was polymerized. The temperature of polymerization should preferably be not higher than 60° C. as discoloured products are otherwise obtained.

What we claim is:

1. A process for the polymerization of a vinyl halide comprising polymerizing said vinyl halide in the liquid phase and in the presence of a catalyst consisting of a peroxide of an aldehyde containing not less than three and not more than four carbon atoms in the molecule and containing an olefinic double bond.

2. A process for the polymerization of a vinyl compound, which comprises polymerizing said vinyl compound in the liquid phase and in the presence of a catalyst consisting of a peroxide of an aldehyde containing not less than three and not more than four carbon atoms in the molecule and containing an olefinic double bond.

3. A process for the polymerization of vinyl halide, which comprises polymerizing said vinyl halide in the liquid phase and in the presence of a catalyst consisting of a peroxide of an aldehyde containing not less than three and not more than four carbon atoms in the molecule and containing an olefinic double bond, at a temperature not in excess of 60° C.

4. A process according to claim 3, wherein the catalyst is the peroxide of acrolein.

5. A process according to claim 3, wherein the catalyst is the peroxide of methylacrolein.

6. A process according to claim 3, wherein the catalyst is the peroxide of crotonaldehyde.

7. A process according to claim 3, wherein the reaction is carried out in solution.

HANNS PETER STAUDINGER.
KARL HEINRICH WALTER TUERCK.
CYRIL ALFRED BRIGHTON.